(12) United States Patent
Kurata et al.

(10) Patent No.: US 11,431,158 B2
(45) Date of Patent: Aug. 30, 2022

(54) RESIN STRUCTURE

(71) Applicant: Yazaki Corporation, Tokyo (JP)

(72) Inventors: Sho Kurata, Makinohara (JP); Hideki Kawamura, Makinohara (JP); Minoru Umezaki, Makinohara (JP); Ko Fujimoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 376 days.

(21) Appl. No.: 16/787,348

(22) Filed: Feb. 11, 2020

(65) Prior Publication Data

US 2020/0295552 A1    Sep. 17, 2020

(30) Foreign Application Priority Data

Mar. 11, 2019 (JP) .............................. JP2019-044090

(51) Int. Cl.
*H02G 3/14* (2006.01)
*B60R 16/03* (2006.01)
*H02G 3/16* (2006.01)

(52) U.S. Cl.
CPC .............. *H02G 3/14* (2013.01); *B60R 16/03* (2013.01); *H02G 3/16* (2013.01)

(58) Field of Classification Search
CPC .... H01R 13/52; H01R 13/502; H01R 13/506; H01R 13/5227; B60R 16/0238; B60R 16/0239; B60R 16/03; H02G 3/081; H02G 3/088; H02G 3/14; H02G 3/16
See application file for complete search history.

(56) References Cited

U.S. PATENT DOCUMENTS

| | | | |
|---|---|---|---|
| 5,668,350 A | 9/1997 | Yanase | |
| 7,762,415 B2* | 7/2010 | Matsui | H05K 5/0069 174/58 |
| 9,000,297 B2* | 4/2015 | Makino | H05K 5/0208 174/50 |
| 2008/0083549 A1* | 4/2008 | Iizuka | H02G 3/081 174/50 |
| 2012/0285728 A1 | 11/2012 | Sakai et al. | |
| 2020/0295550 A1* | 9/2020 | Kurata | H02G 3/088 |

FOREIGN PATENT DOCUMENTS

| | | |
|---|---|---|
| JP | 9-118357 A | 5/1997 |
| JP | 11-341646 A | 12/1999 |
| JP | 2012-239336 A | 12/2012 |
| JP | 2017-22824 A | 1/2017 |

* cited by examiner

*Primary Examiner* — Oscar C Jimenez
(74) *Attorney, Agent, or Firm* — Sughrue Mion, PLLC

(57) ABSTRACT

A resin structure includes a first resin body, and a second resin body. The second resin body is fit to an outer surface of the first resin body while being slid to one side in a sliding direction along the outer surface of the first resin body. The second resin body includes a pair of end edge portions. The pair of end edge portions extend in inclined directions that are inclined with respect to the sliding direction, such that a gap between the pair of end edge portions in a width direction gradually decreases toward one side of the sliding direction, the width direction being orthogonal to the sliding direction and extending along the outer surface. The first resin body includes a pair of facing surfaces spaced apart in the width direction and facing each other.

3 Claims, 11 Drawing Sheets

RESIN STRUCTURE

CROSS REFERENCE TO RELATED APPLICATIONS

This application claims priority from Japanese Patent Application No. 2019-044090 filed on Mar. 11, 2019, the entire contents of which are incorporated herein by reference.

BACKGROUND OF THE INVENTION

Field of the Invention

The present invention relates to a resin structure.

Description of Related Art

A resin structure formed by assembling a plurality of resin bodies to each other, such as a relay box (electric connection box) mourned on a vehicle, is widely known in related art (for example, see Patent Literature 1; JP-A-2017-022824).
[Patent Literature 1] JP-A-2017-022824

When forming the resin structure as described above, for example, a second resin body may be attached to an outer surface of a first resin body while the second resin body is slid along the outer surface of the first resin body. In the resin structure having a structure corresponding to such assembly, after the second resin body is fit to the first resin body, there may be a relative movement (backlash) between the first resin body and the second resin body. In this case, it is concerned that for example, abnormal noise may be generated or the water stop function at the location where both resin bodies are fit may be deteriorated due to the relative movement.

SUMMARY

One or more embodiments provide a resin structure in which a relative movement (backlash) between a first resin body and a second resin body can be prevented when assembling the second resin body to an outer surface of the first resin body while the second resin body is slid along the outer surface of the first resin body.

In an aspect (1), a resin structure includes a first resin body, and a second resin body. The second resin body is fit to an outer surface of the first resin body while being slid to one side in a sliding direction along the outer surface of the first resin body. The second resin body includes a pair of end edge portions. The pair of end edge portions extend in inclined directions that are inclined with respect to the sliding direction, such that a gap between the pair of end edge portions in a width direction gradually decreases toward one side of the sliding direction, the width direction being orthogonal to the sliding direction extending along the outer surface. The first resin body includes a pair of facing surfaces spaced apart in the width direction and facing each other. The pair of facing surfaces extend in the inclined direction and faces the pair of end edge portions respectively. The first resin body and the second resin body form a first water stop structural unit in which the pair of end edge portions are in press contact with the pair of facing surfaces respectively, in a state where the second resin body is fit to the fast resin body.

In an aspect (2), the first resin body and the second resin body may form a second water stop structural unit which is spaced apart from the first water stop structural unit in the width direction and extends in the sliding direction.

According to the aspect (1), both of the pair of end edge portions and the pair of facing surfaces are inclined with respect to the sliding direction such that gaps therebetween gradually decrease toward one side (that is, a front side in the sliding direction when assembling the second resin body) of the sliding direction. Therefore, in the assembling of the second resin body to the first resin body, the gaps between the pair of end edge portions and between the pair of facing surfaces gradually decrease as the second resin body moves toward the one side of the sliding direction with respect to the first resin body. For this reason, when the second resin body is fit to the first resin body, the pair of end edge portions having a wedge function of expanding the pair of facing surfaces in the width direction are pushed between the pair of facing surfaces.

As a result, due to the so-called wedge effect, the pair of end edge portions of the second resin body are pressed and contacted with the pair of facing suffices of the first resin body respectively in a substantially surface contact state. For this reason, the relative movement (backlash) between the first resin body and the second resin body can be appropriately prevented. Further, the pair of end edge portions of the second resin body and the pair of facing surfaces of the first resin body are respectively in press contact with each other, so that intrusion of water through contact portions of the pair of end edge portions and the pair of facing surfaces can be appropriately prevented.

In an initial stage of the assembling process, an end part on one side of the sliding direction (that is, the part where the gap between the pair of end edge portions is the narrowest) of the pair of end edge portions faces one end part on the other side of the sliding direction (that is, the part where the gap between the pair of facing surfaces is the widest) of the pair of facing surfaces in the width direction. As a result, the pair of end edge portions can be inserted between the pair of facing surfaces while a sufficient distance between the pair of end edge portions and the pair of facing surfaces is ensured. Therefore, the workability of assembling both resin bodies is improved.

Therefore, in the resin structure having the above configuration, a relative movement (backlash) between the first resin body and the second resin body can be prevented when assembling the second resin body to an outer surface of the first resin body while the second resin body is slid along the outer surface of the first resin body.

According to the aspect (2), in the state where the second resin body is fit to the first resin body, the first resin body cooperates with the second resin body to form the water stop structural units extending in the sliding direction separately from locations where the pair of end edge portions and the pair of facing surfaces are in press contact. Therefore, it is possible to further improve the water stop property at the locations where the first resin body and the second resin body are fit.

According to one or more embodiments, it is possible to provide a resin structure in which a relative movement (backlash) between a first resin body and a second resin body can be prevented when assembling the second resin body to an outer surface of the first resin body while the second resin body is slid along the outer surface of the first resin body.

The present invention is briefly described above. Details of the present invention will become clearer by reading through an embodiment for implementing the present invention to be described below with reference to the accompanying drawings.

DETAILED DESCRIPTION

Embodiment

Hereinafter, a resin structure 1 according to an embodiment of the present invention shown in FIG. 1 will be described with reference to the drawings. The resin structure 1 is typically a relay box (electric connection box) that is mounted on a vehicle and accommodates electronic components such as a relay. When the resin structure 1 is mounted on the vehicle, a near side (lower left side in FIG. 1) and a far side (upper right side in FIG. 1) in FIG. 1 correspond to a front side and a rear side of the vehicle, respectively.

Figure 1:
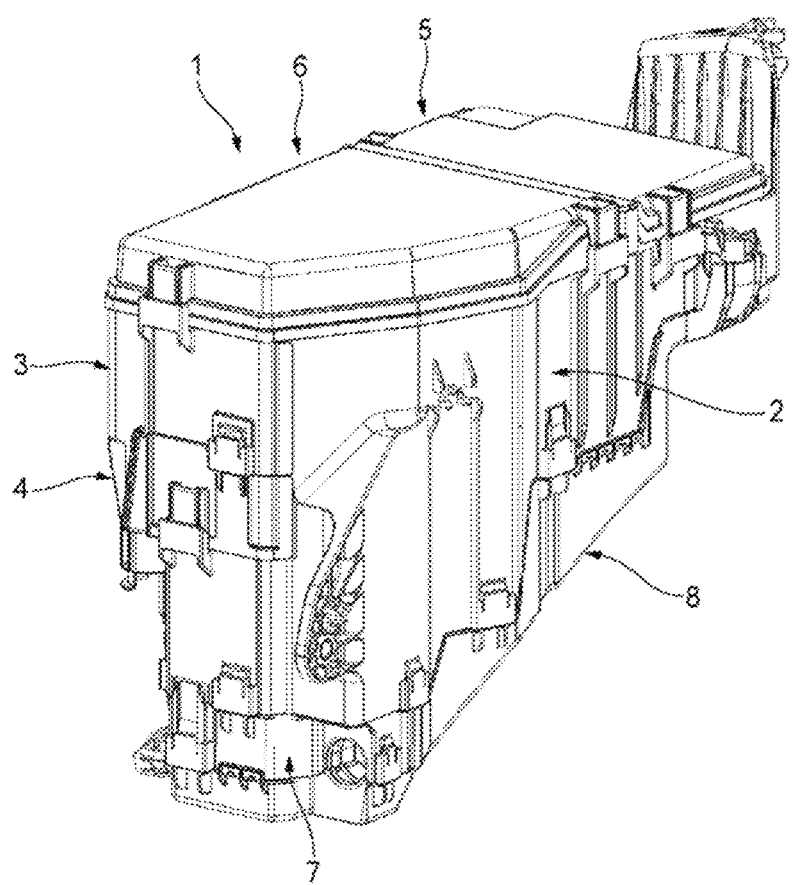
FIG. 1 is a perspective view of a resin structure according to an embodiment.
Figure 2:
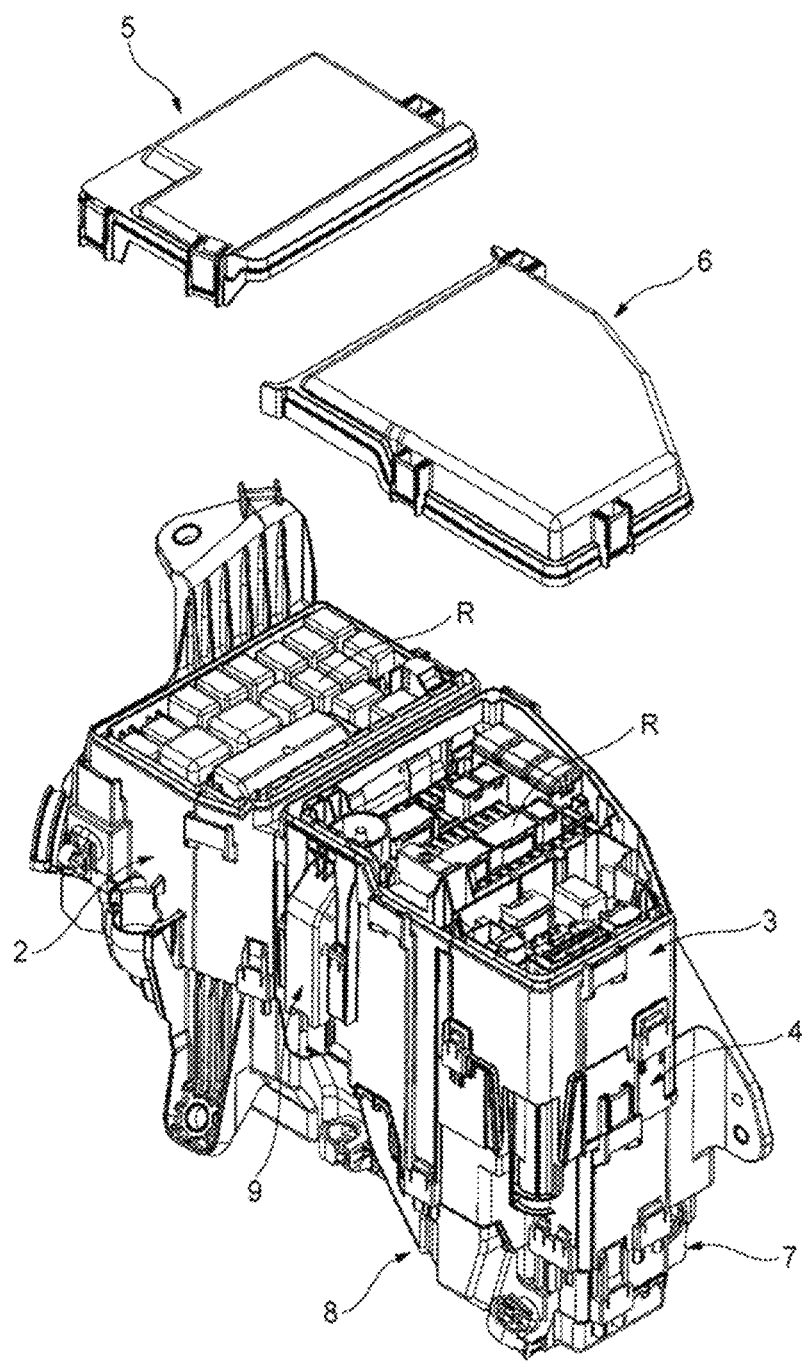
FIG. 2 is a perspective view showing the resin structure in which only a first upper cover and a second upper cover are disfit.

As shown in FIGS. 1 and 2, the resin structure 1 includes a frame 2, a first front cover 3 and a second front cover 4 fit to an upper part of the frame 2 at a vehicle front side, a first upper cover 5 fit to the frame 2 from above so as to close an upper end opening of the frame 2 in a vehicle rear side region, a second upper cover 6 fit to the frame 2 and the first front cover 3 from above so as to close an upper end opening of the first front cover 3 and the frame 2 in a vehicle front side region, an under cover 7 fit a lower part of the frame 2 at a vehicle front side, a lower cover 8 fit to the frame 2 and the under cover 7 from below so as to close a lower end opening of the frame 2 and the under cover 7, and a side cover 9 fit to an outer surface (side surface) of the frame on one side in a left-right direction of the vehicle. All of the eight components configuring the resin structure 1 are resin molded bodies.

As shown in FIG. 2, an electronic component (and other components) R such as a relay is accommodated in the frame 2 and the first from cover 3 (and the second front cover 4). The present invention relates to the structure of the frame 2 and the side cover 9 in the resin structure 1. Therefore, the structure of only the frame 2 and the side cover 9 will be described in detail below.

Figure 3:
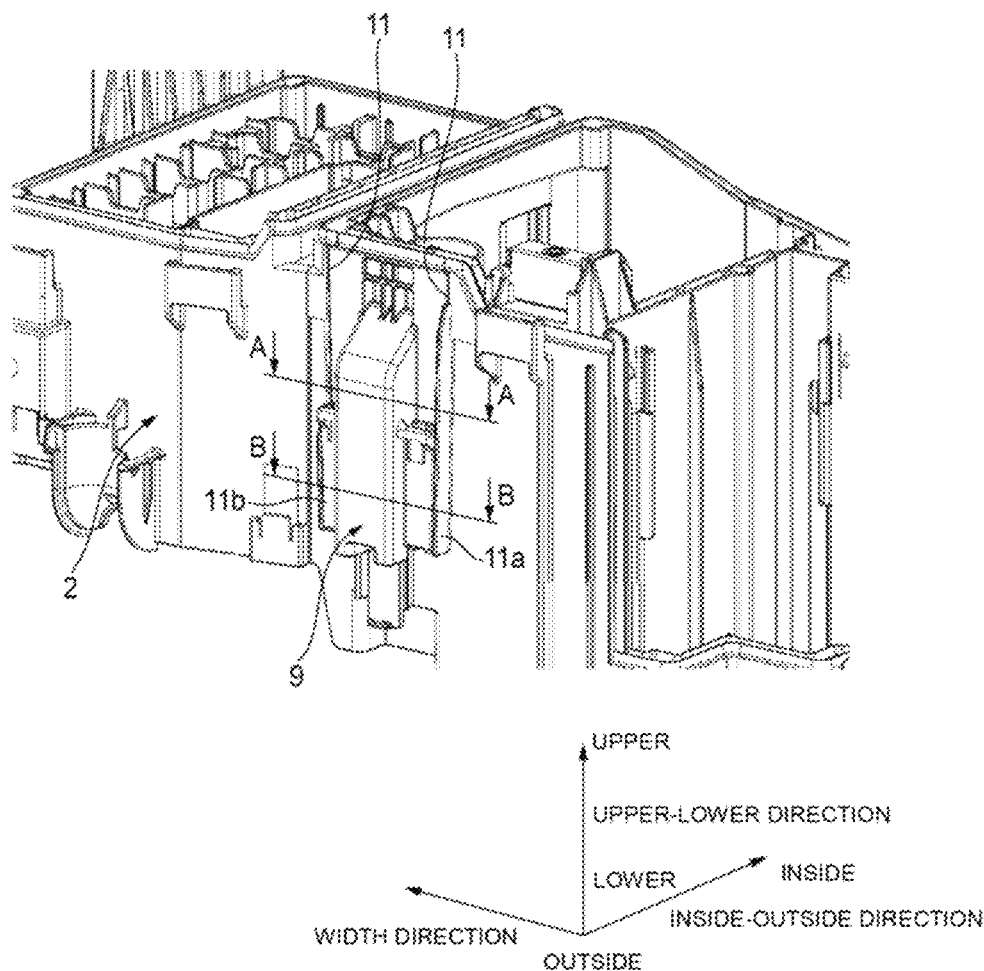
FIG. 3 is an enlarged perspective view showing a state in which a side cover is fit to an outer surface of a frame.

Hereinafter, as shown in FIG. 3, an "inside-outside direction", a "width direction", an "upper-lower direction", as well as "inside", "outside", "upper" and "lower" directions are defined for easy description. The "inside-outside direction", the "width direction", and the "upper-lower direction" are orthogonal to one another. When the resin structure 1 is mounted on a vehicle, the "inside-outside direction", the "width direction", and the "upper-lower direction" correspond to the left-right direction, the front-rear direction and the upper-lower direction of the vehicle.

The side cover 9 is fit to the outer surface of the frame 2 by sliding downward along the outer surface of the frame 2. Therefore, the "upper-lower direction" corresponds to a sliding direction of the side cover 9. A space defined between the side cover 9 fit to the outer surface of the frame 2 and an inner surface of the frame 2 is typically used as a space for accommodating components (not shown) such as terminals.

Figure 4:
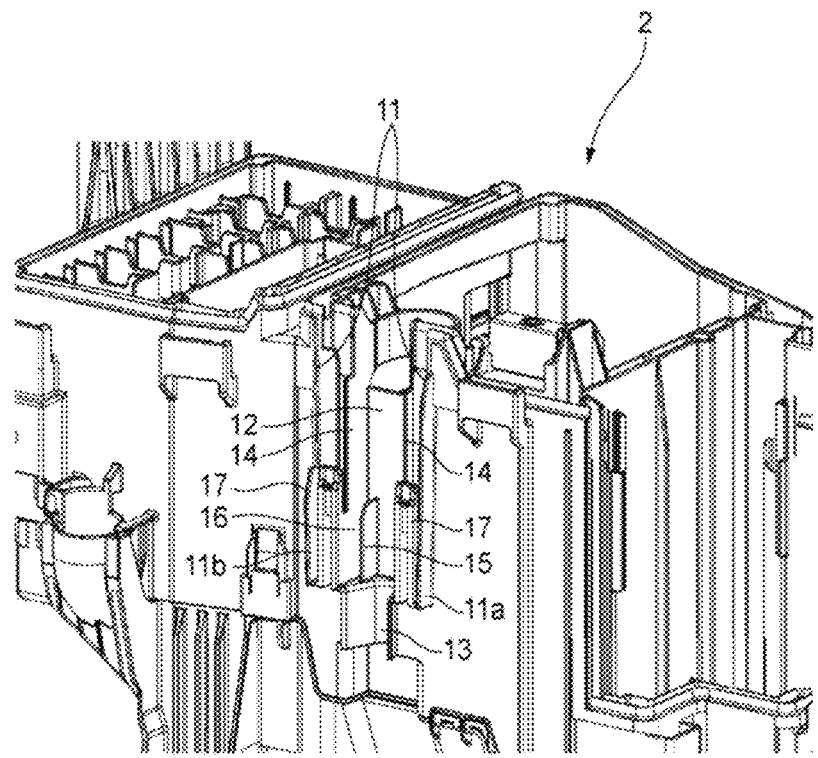
FIG. 4 is an enlarged perspective view showing a portion in the frame to which the side cover is fit.
Figure 5:
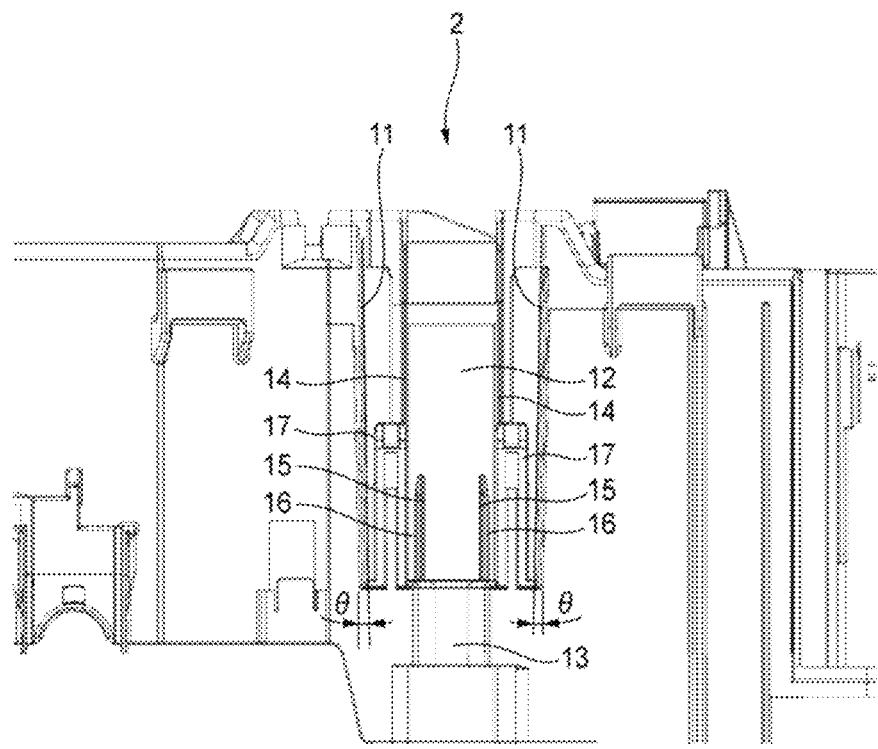
FIG. 5 is an enlarged side view showing the portion in the frame to which the side cover is fit.

First, the frame 2 will be described. As shown in FIGS. 1 to 5, the frame 2 configures most of the appearance of a side surface of the resin structure 1. As shown in FIGS. 3 to 5, a pair of facing surfaces 11 are formed, at the position where the side cover 9 is fit to the frame 2, on the outer surface of the frame 2, and is spaced apart from each other in the width direction and faces each other in the width direction. When assembling the side cover 9, a pair of end edge portions 31 (see FIG. 6 or the like) to be described later of the side cover 9 come into press contact with the pair of facing surfaces 11.

As shown in FIG. 5, each of the pair of facing surfaces 11 is a flat surface extending while inclining by an angle θ with respect to the upper-lower direction so that a gap between the facing surfaces 11 gradually decreases toward the lower side. The angle θ is a value larger than a so-called "draft angle" that is usually provided in order to improve the die-cutting property when molding a resin molded body using a die. In other words, the pair of facing surfaces 11 intentionally designed to be inclined by the angle θ which is larger than a general draft angle is inclined more largely than a pair of water stop plates 25 (see FIG. 8 or the like) that usually have only an inclination of an angle corresponding to the draft angle (which can be said to be substantially parallel to the upper-lower direction). The angle θ is not particularly limited as long as it is determined in consideration of the workability of assembling, water stop property, and the like, but is 3 degrees or more and 5 degrees or less as an example.

In the present embodiment, a pair of water stop plates 11a and 11b that protrude from the outer surface of the frame 2 further to the outside is provided continuously from the pair of facing surfaces 11 in order to improve the water stop property. As can be understood from FIGS. 3 and 4, in the present embodiment, for the pair of water stop plates 11a and 11b, the water stop plate 11a on the right side in FIGS. 3 and 4 (corresponding to the front side of the vehicle) is provided across the entire region of the corresponding facing surface 11 in the upper-lower direction, while the water stop plate 11b oar the left side in FIGS. 3 and 4 (corresponding to the rear side of the vehicle) is provided only in a lower region of the corresponding facing surface 11 in the upper-lower direction. This is based on the idea of more reliably preventing water from entering from the front of the vehicle.

In a region between the pair of facing surfaces 11 on the outer surface of the frame 2, a component accommodating portion 12 that is recessed to the inside and extends in the upper-lower direction is provided. The component accommodating portion 12 extends in the upper-lower direction corresponding to the entire region of the pair of facing surfaces 11 in the upper-lower direction. The component accommodating portion 12 is used as a part of the space for accommodating components such as terminals.

At a lower end portion of the component accommodating portion 12, an electric wire accommodating portion 13 that is recessed to the inside and extends in the upper-lower direction is provided so as to communicate with the component accommodating portion 12 in the upper-lower direction. The electric wire accommodating portion 13 is used as a part of the space for accommodating electric wires extending downward from the components such as terminals.

Figure 10:
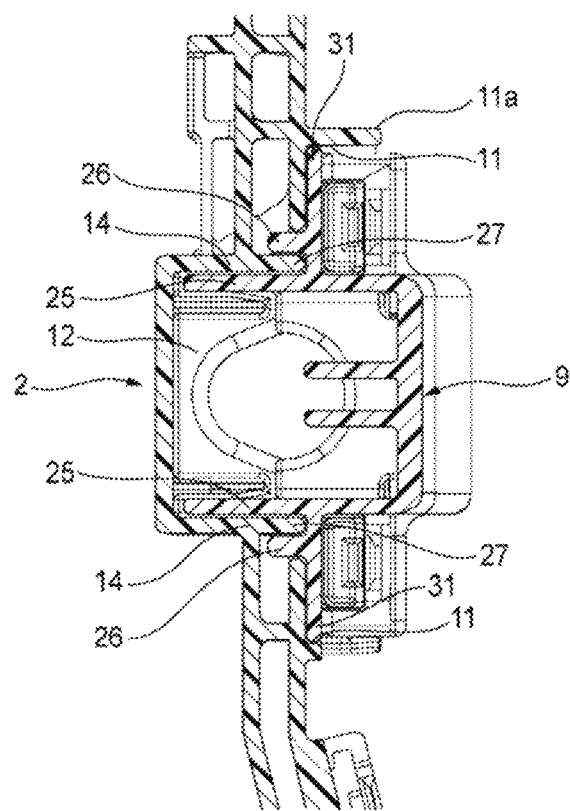
FIG. 10 is a cross-sectional view taken along a line A-A in FIG. 3.
Figure 11:
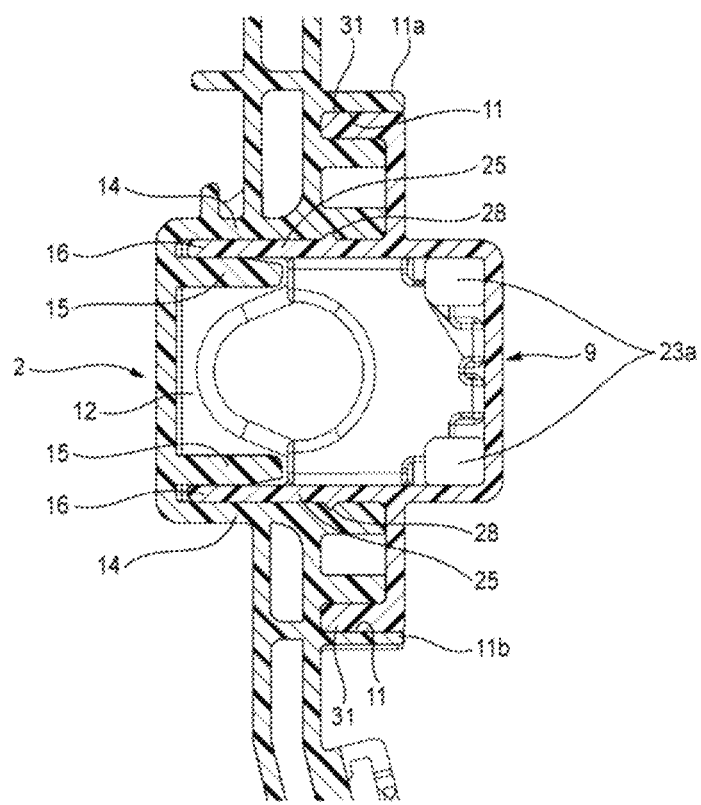
FIG. 11 is a cross-sectional view taken along a line B-B in FIG. 3.

On both side portions in the width direction of the component accommodating portion 12, a pair of water stop plates 14 protrudes to the outside from the outer surface of the frame 2 continuously from inner wall surfaces on both sides in the width direction of the component accommodating portion 12 and extends in the upper-lower direction (also see FIGS. 10 and 11). The pair of water stop plates 14 extends in the upper-lower direction corresponding to the entire region of the component accommodating portion 12 (that is, the pair of facing surfaces 11) in the upper-lower direction.

A pair of water stop plates 15 is provided inside the component accommodating portion 12 at a position away from the pair of water stop plates 14 by a predetermined distance toward the inside in the width direction. The pair of water stop plates 15 protrudes to the outside from a bottom surface of the component accommodating portion 12 and extends in the upper-lower direction corresponding to only a lower region of the pair of water stop plates 14. As a result, a pair of grooves 16 that open to the outside and extend in the upper-lower direction are formed between the pair of water stop plates 14 and the pair of water stop plates 15 in the lower region of the pair of water stop plates 14 (also see FIG. 11).

A pair of locking pieces 17 that protrude toward the upper side is integrally provided with the pair of water stop plates 14 in the lower region of the pair of water stop plates 14 between the pair of facing surfaces 11 and the pair of water stop plates 14. When assembling the side cover 9, the pair of locking pieces 17 is inserted to through holes 29a of a pair of locking portions 29 on the side cover 9 to be described below.

Figure 8:
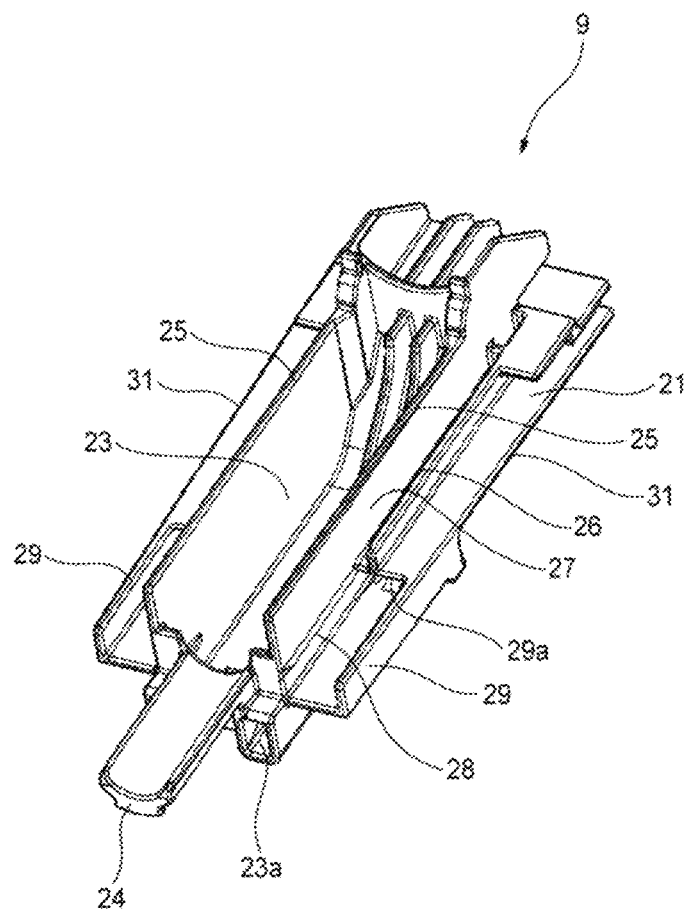
FIG. 8 is a perspective view of the side cover as seen from the inside.
Figure 9:
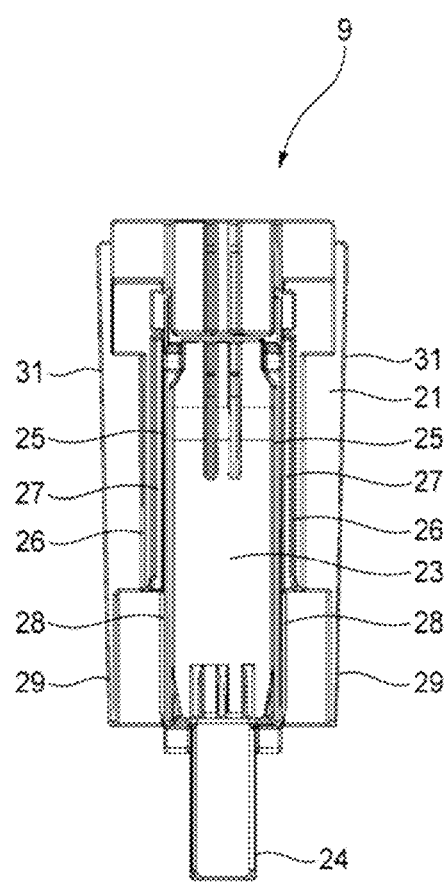
FIG. 9 is a plan view of the side cover as seen from the inside.

Next, the side cover 9 will be described. As shown in FIGS. 6 to 9, the side cover 9 includes a flat plate portion 21 having a substantially rectangular flat plate shape. The raised portion 22 that protrudes to the outside and extends in the upper-lower direction is formed at the center portion in the width direction of the flat plate portion 21. The raised portion 22 extends further to the lower side from a lower end edge of the flat plate portion 21. As shown in FIGS. 8 and 9, a component accommodating portion 23 that is recessed to the outside and extends in the upper-lower direction is formed in an inner surface side of the raised portion 22. A pair of drain holes 23a penetrating in the upper-lower direction is formed at a lower end portion of the component accommodating portion 23 (see FIGS. 8 and 11).

An electric wire accommodating portion 24 is connected to the lower end portion of the component accommodating portion 23 so as to protrude to the lower side. When the side cover 9 is fit, the component accommodating portion 23 and the electric wire accommodating portion 24 cooperate with the component accommodating portion 12 and the electric wire accommodating portion 13 of the frame 2 separately, so as to define the space for accommodating components such as terminals and the space for accommodating electric wires extending from the components.

On both side portions in the width direction of the component accommodating portion 23, a pair of water stop plates 25 protrudes to the inside from the inner surface of the flat plate portion 21 continuously from inner wall surfaces on both sides in the width direction of the component accommodating portion 23 and extends in the upper-lower direction (also see FIGS. 10 and 11).

A pair of water stop plates 26 is provided on the flat plate portion 21 at a position away from the pair of water stop plates 25 by a predetermined distance toward the outside in the width direction. The pair of water stop plates 26 protrudes to the inside from an inner surface of the flat plate portion 21 and extends in the upper-lower direction corresponding to only an upper region of the pair of water stop plates 25. The pair of water stop plates 26 extends toward the lower side to the lower end edge of the flat plate portion 21. As a result, a pair of grooves 27 that open to the inside and extend in the upper-lower direction are formed between the pair of water stop plates 25 and the pair of water stop plates 26 in the upper region of the pair of water stop plates 25 (also see FIG. 10).

A pair of water stop ribs 28 that protrude to the outside in the width direction and extend in the upper-lower direction are formed at regions lower than the pair of water stop plates 26 on the outer side surface in the width direction of the pair of water stop plates 25 (also see FIG. 11).

The pair of locking portions 29 is integrally provide with the pair of water stop plates 25 so as to extend to the lower side from the lower end edge of the flat plate portion 21 at an outer surface side of lower end portions on both sides in the width direction of the flat plate portion 21. In the pair of locking portions 29, a pair of through holes 29a penetrating in the upper-lower direction is formed.

Figure 6:
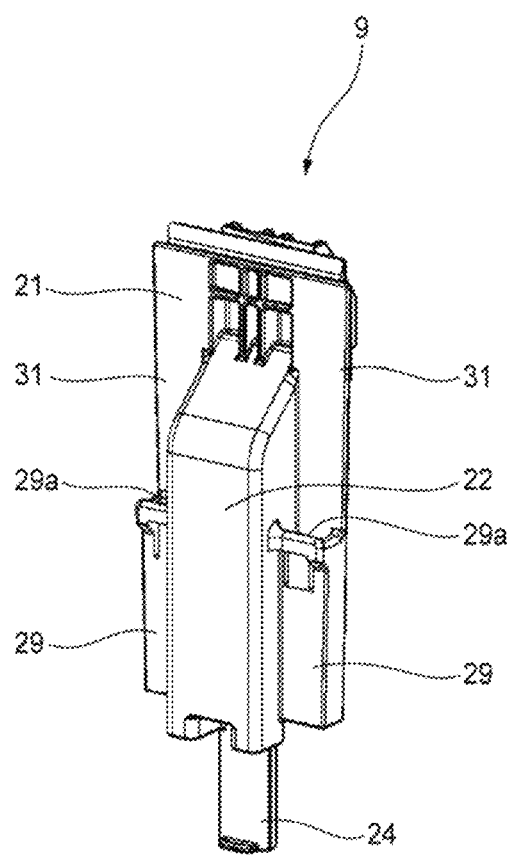
FIG. 6 is a perspective view of the side cover.
Figure 7:
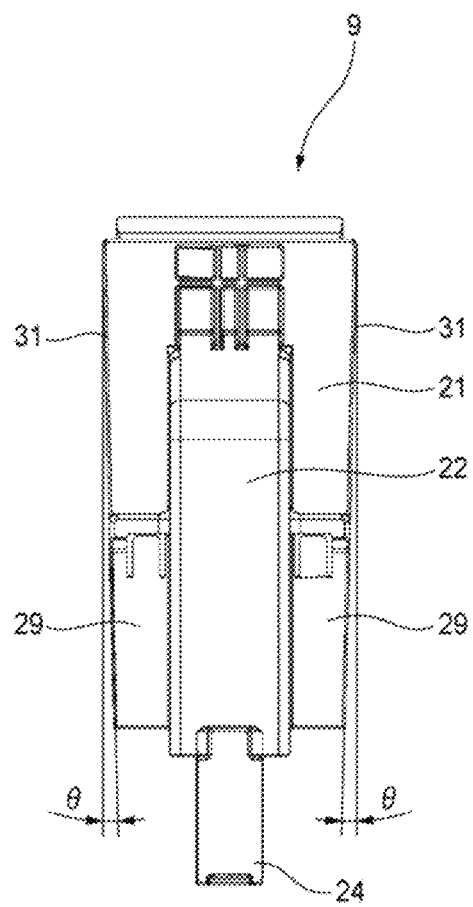
FIG. 7 is a plan view of the side cover.

The pair of end edge portions 31 on both sides in the width direction of the side cover 9 is configured by a pair of end edge portions on both sides in the width direction of the flat plate portion 21 and a pair of end edge portions on both sides in the width direction of the pair of locking portions 29 (particularly, see FIGS. 6 and 8). Like the pair of facing surfaces 11 of the frame 2, each of the pair of end edge portions 31 is a flat surface extending while inclining by an angle θ with respect to the upper-lower direction so that a gap between the end edge portions 31 gradually decreases toward the lower side. The structures of the frame 2 and the side cover 9 are described above.

Next, a procedure for assembling the side cover 9 to the frame 2 will be described. When assembling the side cover 9 to the frame 2, the side cover 9 is brought close to the upper part of the frame 2 where the side cover 9 is to be fit, and lower end portions of the pair of end edge portions 31 of the side cover 9 are made to face the upper end portions of the pair of facing surfaces 11 of the frame 2 in the width direction.

In this state, the pair of water stop plates 25 of the side cover 9 and the pair of grooves 16 of the frame 2 coincide with each other in position in the width direction (see FIG. 11), and the pair of water stop plates 14 of the frame 2 and the pair of grooves 27 of the side cover 9 coincide with each other in position in the width direction (see FIG. 10). Further, the through holes 29a of the pair of locking portions 29 of the side cover 9 and the pair of locking pieces 17 of the frame 2 are coaxial positioned in the upper-lower direction.

Next, the side cover 9 is slid downward with respect to the frame 2 from this state. In this process, the pair of water stop plates 25 of the side cover 9 enters the pair of grooves 16 of the frame 2 from the upper side, and the pair of water stop plates 14 of the frame 2 enters the pair of grooves 27 of the side cover 9 from the upper side. Further, since both of the pair of end edge portions 31 and the pair of facing surfaces 11 are inclined by the angle θ with respect to the upper-lower direction such that the gaps between the end edge portions 31 and between the pair of facing surfaces 11 gradually decrease toward the lower side, the gaps between the pair of edge portions 31 and between the pair of facing surfaces 11 gradually decrease. Further, the pair of locking pieces 17 is inserted into the pair of through holes 29a.

When the side cover 9 reaches an assembly completion position, the pair of locking pieces 17 are locked to the pair of through holes 29a. In addition, the pair of edge portions 31 are respectively (in the plane) in contact with the pair of facing surfaces 11 and are maintained in a pressed state due to a so-called wedge effect. For this reason, the occurrence of relative movement (backlash) between the frame 2 and the side cover 9 can be effectively prevented. Further, the pair of end edge portions 31 and the pair of facing surfaces 11 are respectively (in the plane) in press contact with each other, so that intrusion of water through contact portions of the pair of end edge portions 31 and the pair of facing surfaces 11 can be effectively prevented.

When the assembling of the side cover 9 is completed, as shown in FIG. 10, upper regions of the pair of water stop plates 14 of the frame 2 enter the pair of grooves 27 of the side cover 9. As shown in FIG. 11, lower regions of the pair of water stop plates 25 of the side cover 9 enter the pair of grooves 16 of the frame 2, and the pair of water stop ribs 28 of the side cover 9 is in press contact with respective lower regions on inner side surfaces in the width direction of the pair of water stop plates 14 of the frame 2, As described above, when the assembling of the side cover 9 is completed, a pair of "water stop structural units" extending in the upper-lower direction is configured.

In a lower region (first region) of the pair of water stop structural units, as shown in FIG. 11, the water stop function is exhibited by the pair of water stop ribs 28 that is in press contact with the inner side surface of the pair of water stop plates 14 in the width direction (first water stop structure by the press contact). Further, in an upper region (second region) of the pair of "water stop structural unit", as shown in FIG. 10, the water stop function is exhibited by a labyrinth structure in which the water stop plate 14 enters the groove 27 so that a water entering, path (creeping distance) is lengthened (second water stop structure by securing the creeping distance).

In general, when the second water stop structure by securing the creeping distance is adopted, the water stop property of the water stop structural unit is increased since the water entering path (creeping distance) is lengthened as compared with the case where the first water stop structure by press contact is adopted. On the other hand, when the second water stop structure by securing the creeping distance is adopted, it is necessary to adjust the relative position and relative posture of the frame 2 and the side cover 9 so as to allow the water stop plate to enter the groove, and the assembling property of the side cover 9 to the frame 2 is likely to be lowered. On the contrary, when the first water stop structure by press contact is adopted, the assembling property of the side cover 9 to the frame 2 is increased as compared with the case where the second water stop structure by securing the creeping distance is adopted. In addition, as compared with the case where the second water stop structure by securing the creeping distance in the lower region of the water stop structural unit is adopted, when the first water stop structure by press contact in the lower region of the water stop structural unit is adopted, it is easier to push the side cover 9 into the frame 2, and to improve the assembling property of the side cover 9 to the frame 2.

From the above, according to the configuration, the assembling property of the side cover 9 to the frame 2 can be increased by adopting the first water stop structure by press contact in the lower region of the water stop structural unit, and the water stop property of the water stop structural unit can be improved by adopting the second water stop structure by securing a first creeping distance in the upper region of the water stop structural unit.

Further, in the lower region (first region) of the pair of water stop structural unit, as shown in FIG. 11, in addition to the first water stop structure, the water stop function is also exhibited by a labyrinth structure in which the water stop plate 25 enters the groove 16 so that a water entering path (creeping distance) is lengthened (third water stop structure by securing the creeping distance).

Therefore, even in the lower region of the water stop structural unit where the first water stop structure by the press contact that tends to be inferior in water stop property is adopted, the water stop property can be further improved by using the third water stop structure by ensuring the creeping distance. As a result, the water stop property of the entire water stop structural unit extending in the upper-lower direction can be further improved.

According to the resin structure 1 in the embodiment of the present invention, both of the pair of end edge portions 31 of the side cover 9 and the pair of facing surfaces 11 of the frame 2 are inclined with respect to the upper-lower direction such that the gap therebetween gradually decreases toward one side (lower side) of the sliding direction (upper-lower direction). Therefore, in the assembling of the side cover 9 to the frame 2, the gaps between the pair of end edge portions 31 and between the pair of facing surfaces 11 gradually decrease as the side cover 9 moves to the lower side with respect to the frame 2. For this reason, in a state where the side cover 9 is fit to the frame 2, the pair of end edge portions 31 are pressed and contacted with the pair of facing surfaces 11 respectively in a substantially surface contact state due to a so-called wedge effect. For this reason, the occurrence of relative movement (backlash) between the frame 2 and the side cover 9 can be effectively prevented. Further, the pair of end edge portions 31 and the pair of facing surfaces 11 are respectively in press contact with each other, so that intrusion of water through contact portions of the pair of end edge portions 31 and the pair of facing surfaces 11 can be effectively prevented.

In an initial stage of assembling the side cover 9, a lower end part (that is, the part where the gap between the pair of end edge portions 31 is the narrowest) of the pair of end edge portions 31 faces an upper end part (that is, the part where the gap between the pair of facing surfaces 11 is the widest) of the pair of facing surfaces 11 in the width direction, so that a gap between the pair of end edge portions 31 and the pair of facing surfaces 11 is widened. As a result, the assembling property of the side cover 9 is improved.

Further, according to the resin structure 1 in the embodiment of the present invention, in a state where the side cover 9 is fit to the frame 2, the frame 2 cooperates with the side cover 9 to form a pair of "water stop structural unit" extending in the upper-lower direction separately from the contact portions of the pair of end edge portions 31 and the pair of facing surfaces 11. Specifically, the resin structure 1 includes a first water stop structure by the pair of water stop ribs 28 being in press contact with the pair of water stop plates 14, a second water stop structure in which the water stop plate 14 enters the groove 27 so that a water entering path (creeping distance) is lengthened, and a third water stop structure in which the water stop plate 25 enters the groove 16 so that a water entering path (creeping distance) is lengthened. Therefore, in the resin structure 1, it is possible to provide further water stop property at the locations where the frame 2 and the side cover 9 are fit.

OTHER EMBODIMENTS

The present invention is not limited to the above embodiment and various modifications can be adopted within the scope of the present invention. For example, the present invention may be appropriately modified, improved or the like. Additionally, materials, shapes, sizes, numbers, arrangement locations, and the like of elements in the above embodiments are optional and are not limited as long as the present invention can be implemented.

Further, in the above embodiment, in a state where the side cover 9 is fit to the frame 2, the pair of "water stop structural unit" extending in the upper-lower direction is added separately from the contact portions of the pair of end edge portions 31 the pair of facing surfaces 11. However, the pair of "water stop structural unit" extending in the upper-lower direction may not be added.

Further, in the above embodiment, the resin structure 1 is a relay box (electric connection box) that accommodates a plurality of electronic components R, but the resin structure 1 may also be a structure having a function other than the relay box (electric connection box).

Herein features of the above embodiment of the resin structure 1 according to the present invention are briefly summarized and listed in the following [1] and [3].
[1] A resin structure comprising:
a first resin body; and
a second resin body,
wherein the second resin body is fit to an outer surface of the first resin body while being slid to one side in a sliding direction along the outer surface of the first resin body,
wherein the second resin body includes a pair of end edge portions,
wherein the pair of end edge portions extend in inclined directions that are inclined with respect to the sliding direction, such that a gap in a width direction, between the pair of end edge portions gradually decreases toward one side of the sliding direction, the width, direction being orthogonal to the sliding direction and extending along the outer surface,
wherein the first resin body includes a pair of facing surfaces spaced apart and facing each other in the width direction,
wherein the pair of facing surfaces extends in the inclined, direction and faces the pair of end edge portions respectively, and
wherein the first resin body and the second resin body form a first water stop structural unit in which the pair of end edge portions are in press contact with the pair of facing surfaces respectively, in a state where the second resin body is fit to the first resin body.
[2] In the resin structure according to [1],
wherein the first resin body and the second resin body form a second water stop structural unit which is spaced apart from the first water stop structural unit in the width direction and extends in the sliding direction.

[3] In the resin structure according to [2],
wherein the second water stop structural unit includes a first water stop structure portion, a second water stop structure portion, and a third water stop structure portion,
wherein a pair of water stop ribs are in press contact with a first pair of water stop plates in the first water stop structure portion,
wherein the first pair of water stop plates are fit into a first pair of grooves respectively in the second water stop structure portion so that a creeping distance is lengthened, and
wherein a second pair of water stop plates are lit into a second pair of grooves respectively in the third water stop structure portion so that a creeping distance is lengthened.

DESCRIPTION OF REFERENCE NUMERALS AND SIGNS 1 resin structure
2 frame (first resin body)
9 side cover (second resin body)
11 facing surface
31 end edge portion

What is claimed is:
1. A resin structure comprising:
a first resin body; and
a second resin body,
wherein the second resin body is configured to be fit to an outer surface of the first resin body while being slid to one side in a sliding direction along the outer surface of the first resin body,
wherein the second resin body includes a pair of end edge portions that face away from each other,
wherein the pair of end edge portions extend in inclined directions that are inclined with respect to the sliding direction, such that a gap between the pair of end edge portions in a width direction gradually decreases toward the one side of the sliding direction, the width direction being orthogonal to the sliding direction and extending along the outer surface orthogonally to a facing direction of the outer surface,
wherein the first resin body includes a pair of facing surfaces spaced apart in the width direction and facing each other,
wherein the pair of facing surfaces extends in the inclined direction, such that a gap between the pair of facing surfaces in the width direction gradually decreases toward the one side of the sliding direction, and faces the pair of end edge portions respectively, and
wherein the first resin body and the second resin body form a first water stop structural unit in which the pair of end edge portions are in direct, press contact with the pair of facing surfaces respectively, in a state where the second resin body is fit to the first resin body.
2. The resin structure according to claim 1,
wherein the first resin body and the second resin body form a second water stop structural unit which is spaced apart from the first water stop structural unit in the width direction and extends in the sliding direction.
3. A resin structure comprising:
a first resin body; and
a second resin body,
wherein the second resin body is configured to be fit to an outer surface of the first resin body while being slid to one side in a sliding direction along the outer surface of the first resin body,
wherein the second resin body includes a pair of end edge portions, wherein the pair of end edge portions extend in inclined directions that are inclined with respect to the sliding direction, such that a gap between the pair of end edge portions in a width direction gradually decreases toward the one side of the sliding direction, the width direction being orthogonal to the sliding direction and extending along the outer surface, wherein the first resin body includes a pair of facing surfaces spaced apart in the width direction and facing each other, wherein the pair of facing surfaces extends in the inclined direction and faces the pair of end edge portions respectively, wherein the first resin body and the second resin body form a first water stop structural unit in which the pair of end edge portions are in press contact with the pair of facing surfaces respectively, in a state where the second resin body is fit to the first resin body, wherein the first resin body and the second resin body form a second water stop structural unit which is spaced apart from the first water stop structural unit in the width direction and extends in the sliding direction, wherein the second water stop structural unit includes a first water stop structure portion, a second water stop structure portion, and a third water stop structure portion, wherein a pair of water stop ribs are in press contact with a first pair of water stop plates in the first water stop structure portion, wherein the first pair of water stop plates are fit into a first pair of grooves respectively in the second water stop structure portion so that a creeping distance is lengthened, and wherein a second pair of water stop plates are fit into a second pair of grooves respectively in the third water stop structure portion so that a creeping distance is lengthened.

\* \* \* \* \*